United States Patent [19]

Stoen et al.

[11] Patent Number: 5,401,135

[45] Date of Patent: Mar. 28, 1995

[54] FOLDABLE PLATFORM WHEELCHAIR LIFT WITH SAFETY BARRIER

[75] Inventors: Jeffrey J. Stoen, Glenwood; Lynn O. Ringdahl, Alexandria, both of Minn.

[73] Assignee: Crow River Industries, Brooten, Minn.

[21] Appl. No.: 182,644

[22] Filed: Jan. 14, 1994

[51] Int. Cl.$^6$ ................................. B60P 1/48
[52] U.S. Cl. ................................. 414/546; 414/917; 414/921
[58] Field of Search .............. 414/540, 545, 546, 556, 414/917, 921

[56] References Cited

U.S. PATENT DOCUMENTS

| | | | |
|---|---|---|---|
| 3,498,481 | 3/1970 | Size | 414/558 |
| 3,912,048 | 10/1975 | Manning | 414/541 |
| 4,058,228 | 11/1977 | Hall | 414/549 |
| 4,124,130 | 11/1978 | Rohrs et al. | 414/921 X |
| 4,134,504 | 1/1979 | Salas et al. | 414/921 X |
| 4,140,230 | 2/1979 | Pearson | 414/921 X |
| 4,180,366 | 12/1979 | Roth et al. | 414/540 |
| 4,407,623 | 10/1983 | Parks | 414/540 |
| 4,556,128 | 12/1985 | Thorley et al. | 414/540 X |
| 4,579,503 | 4/1986 | Disque | 414/546 X |
| 4,606,433 | 8/1986 | Smalley et al. | 414/921 X |
| 4,907,936 | 3/1990 | Bourdage | 414/921 X |
| 4,958,979 | 9/1990 | Svensson | 414/921 X |
| 5,040,936 | 8/1991 | Rhea | 414/921 X |
| 5,105,915 | 4/1992 | Gary | 414/921 X |
| 5,158,419 | 10/1992 | Kempf et al. | 414/921 X |
| 5,180,275 | 1/1993 | Czech et al. | 414/921 X |

FOREIGN PATENT DOCUMENTS

| | | | |
|---|---|---|---|
| 3325036 | 11/1983 | Germany. | |
| 186541 | 11/1982 | Japan | 414/921 |
| 186543 | 11/1982 | Japan | 414/921 |
| 2224992 | 5/1990 | United Kingdom | 414/921 |

*Primary Examiner*—David A. Bucci
*Attorney, Agent, or Firm*—Palmatier, Sjoquist & Helget

[57] ABSTRACT

A wheelchair lifting platform device for raising or lowering of a wheelchair into or out of a vehicle. The invention includes a barrier safety mechanism which is connected to a wheelchair platform. The barrier safety mechanism includes a barrier plate and an activator flipper plate. The barrier plate extends vertically from, and is positioned substantially perpendicular to, a foldable platform during the raising or lowering of a wheelchair. The barrier plate functions as a safety stop prohibiting the inadvertent rolling of a wheelchair off of the platform. The activator flipper plate is pivotally connected to the platform and to the barrier plate. The activator flipper plate functions to engage a road surface as the platform is lowered, for retraction of the barrier plate as the activator flipper plate engages the ground. The invention additionally includes a latching mechanism for coupling a foldable wheelchair platform to the frame of a wheelchair lift device. The improved latching mechanism includes a slide having a handle, and a notch having an engagement lip. The manipulation of the handle releasably couples the notch and lip to an engagement pin mounted to the frame of a wheelchair lift device.

23 Claims, 5 Drawing Sheets

FOLDABLE PLATFORM WHEELCHAIR LIFT WITH SAFETY BARRIER

BACKGROUND OF THE INVENTION

This invention relates to improvements in wheelchair lift devices to aid persons in the boarding and exiting of a van-type passenger vehicle. There exist a number of different vehicle-mounted boarding aids for use by handicapped persons who cannot ascend or descend from a vehicle in a normal manner. These devices, in general, employ the use of an elevator platform that can be raised or lowered between an inside passenger deck level and an adjacent ground level or curb.

A handicapped passenger in a wheelchair is generally required to position himself/herself upon an elevator platform for lowering to a curb or road surface during the exit from a vehicle. Elevator platforms require an automatic safety barrier which prevents a wheelchair from inadvertently rolling off the elevator ramp during use of the wheelchair lift device. The elevator platforms as known expose an individual to a risk of injury caused by inadvertent rolling of the wheelchair off an elevator ramp.

The risk of a wheelchair inadvertently rolling off the ramp of a wheelchair lift device is significantly increased when a vehicle is parked on a non-flat surface such as a hill. Individuals frequently are required to disembark from a transit vehicle while parked on a hill surface. The inclusion of an automatic safety barrier, which functions as a safety stop, will significantly improve the utility of a wheelchair lifting device to an individual.

The present invention provides a device for facilitating the entrance and exit of handicapped persons into or from a vehicle, by significantly improving the safety of a wheelchair lift device. The invention eliminates risks attributable to a wheelchair inadvertently rolling off an elevator ramp mechanism during use.

The wheelchair lifting devices as known do not provide a convenient latching mechanism for affixing an unfolded platform to a hydraulic frame during the elevation or descent of a wheelchair from a transit vehicle. The latching mechanisms used to affix the two portions of an unfolded frame together generally include complicated latch levers and locks. These devices are difficult to manipulate by an individual confined to a wheelchair. The present invention significantly improves the access to, and use of, a latching mechanism for coupling a platform to the frame of a hydraulic lift. The present invention positions the handle for the latching mechanism at a convenient location on the exterior of an unfolded elevator platform. The latch of the present invention is positioned upon the side of the elevator platform for manipulation by an individual from a wheelchair. The utility of the latching mechanism to an individual is thereby significantly enhanced.

SUMMARY OF THE INVENTION

The present invention improves the safety and use of a wheelchair lifting platform device for raising or lowering of a wheelchair into or out of a vehicle. The invention includes a barrier safety mechanism which is connected to a foldable wheelchair platform. The barrier safety mechanism includes a barrier plate and an activator flipper plate. The barrier plate extends upwardly from the foldable platform during the raising or lowering of a wheelchair. The barrier plate functions as a safety stop prohibiting the inadvertent rolling of a wheelchair off the platform. The activator flipper plate is pivotally connected to the platform and to the barrier plate. The activator flipper plate functions to engage a road surface as the platform is lowered, for retraction of the barrier plate as the activator flipper plate engages the ground. The invention additionally includes an improved latching mechanism for coupling a foldable wheelchair platform to the frame of a wheelchair lift device. The improved latching mechanism includes a slide having a handle, and a notch having an engagement lip. The manipulation of the handle releasably couples the notch and lip to an engagement rod mounted to the frame of a wheelchair lift device.

It is an object of the present invention to provide a foldable wheelchair lift device of relatively simple and inexpensive design, construction, and operation, which is safe and which fulfills the intended purpose without fear of injury to persons and/or damage to property.

It is another object of the present invention to provide a safety barrier mechanism which eliminates risk of accidents involving the inadvertent rolling of a wheelchair off of a platform during use of the wheelchair lift device.

It is still another object of the present invention to provide a safety barrier mechanism which automatically actuates a safety barrier plate into a safety position when the platform is raised from a ground surface or lowered from a vehicle.

It is still another object of the present invention to provide a safety barrier mechanism which automatically retracts a safety barrier plate to a horizontal position upon engagement of the platform to a ground surface.

It is still another object of the present invention to provide a convenient latching mechanism which may be easily manipulated by an individual from a wheelchair, which securely and releasably couples a foldable platform to the frame of a wheelchair lift device.

It is still another object of the invention to provide a platform which may be readily folded in half for storage, wherein the safety barrier plates are automatically secured in a storage position.

A feature of the present invention includes a barrier mechanism pivotally attached to a first platform section and another barrier mechanism pivotally attached to a second platform section, wherein the platform sections may be folded together.

Another feature of the present invention includes a safety barrier plate having a centrally-positioned aperture therethrough.

Still another feature of the present invention includes a safety barrier plate pivotally attached to a pivot rod, where the pivot rod is attached to the platform of the wheelchair lift device.

Still another feature of the present invention is a barrier plate having a rear surface which includes a brace holding a flipper pin which attaches an activator flipper plate to the barrier plate.

Still another feature of the present invention is an activator flipper plate having an engagement edge which has a roller for rolling over a ground or curb surface.

Still another feature of the present invention is a pair of activator flipper plates where each activator flipper plate has a barrier activator rod attached to the platforms of the wheelchair lift device.

Still another feature of the present invention is a flipper tab centrally attached to, and extending outwardly from, each barrier activator rod and corresponding activator flipper plate.

Still another feature of the present invention is a flipper tab having a banana-shaped aperture where the flipper tab is positioned through one of the barrier plates.

Still another feature of the present invention is the angularly offset positioning of an activator flipper plate with respect to a barrier plate, providing pivotal movement of the activator flipper plate about a barrier activator rod downwardly away from either the first or second platform, which releases a compression spring for pivotally elevating the barrier plate into a safety position.

Still another feature of the present invention includes a latching mechanism attached to the second platform section which releasably couples the second section to a boot tube of the wheelchair lift device.

Still another feature of the present invention includes a latching mechanism having an elongate slide which includes at least one elongate aperture, and a notch having an engagement lip, for releasably coupling the latching mechanism to the boot tube of the frame of the wheelchair lift device.

Still another feature of the present invention includes a handle affixed to, and extending vertically upward from, the platform for convenient grasping and manipulation by an individual seated in a wheelchair.

DETAILED SPECIFICATION OF THE PREFERRED EMBODIMENT

One form of the invention is illustrated and described herein. The wheelchair lift device is indicated in general by the numeral 10. The wheelchair lift device 10 is used in conjunction with a van-type vehicle during the transportation of handicapped individuals confined to the use of a wheelchair.

Figure 1:
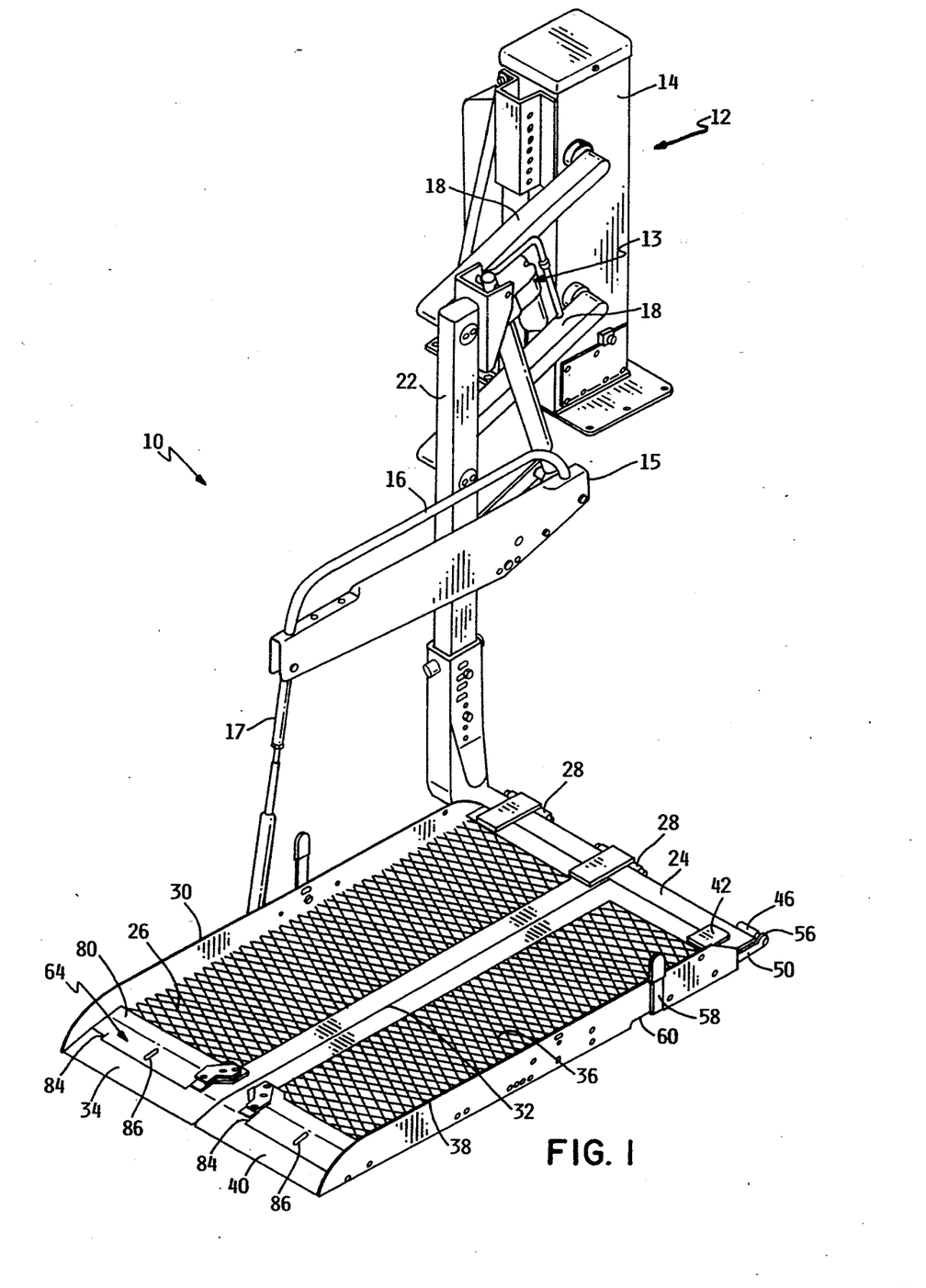
FIG. 1 is an isometric view of the invention.

The wheelchair lift device 10 in general includes a lift mechanism 12 which is preferably positioned within, and is affixed to, the interior of a vehicle. The lift 12 includes a housing 14 surrounding an electric motor and/or pumps for driving a linear actuator 13. Linear actuator 13 is pivotally connected to a support frame 15 which has a handle 16 affixed thereto. Support frame 15 is also pivotally connected to main support frame 22, and to a first platform section 26 via an adjustable extension member 17. The lift 12 is also used to pivotally move support arms 18 as a parallelogram linkage during the raising or lowering of a platform for assisting an individual using a wheelchair into, or from, a vehicle. The lift 12 is preferably operated through the use of various switches or controls for movement of the support arms 18 during the raising or the lowering of the platform. The support arms 18 are pivotally attached to the housing 14 and to a main support frame 22.

The main support frame 22 has a horizontally extending boot tube 24. The boot tube 24 is preferably rigidly affixed to the main support frame 22, and extends horizontally outward therefrom. In one form of alternative construction, the boot tube 24 is pivotally connected to main support frame 22, about a pivot axis which is coincidental with the axial length of boot tube 24. Preferably, the boot tube 24 is positioned proximal to the lip or edge of a doorway of a vehicle for flush horizontal engagement thereto. The boot tube 24 preferably functions as the primary horizontal support member of lift device 10, relative to the main support frame 22. The boot tube 24 is preferably tubular in shape having a square or rectangular cross-sectional dimension. The boot tube 24 is also preferably formed of a sufficiently sturdy metallic material to not fracture, bend, or break during prolonged use of a wheelchair lift device 10.

A first platform section 26 is preferably pivotally affixed to the boot tube 24 by a pair of hinges 28. The first platform section 26 is preferably of one-piece construction formed of sturdy metallic material which may include a metallic meshed runway surface.

The first platform section 26 preferably includes a first lip edge 30, an elongate edge 32, and a first access ledge 34. The first access ledge 34 is preferably tapered for making a smooth transition between the first platform section 26 and a ground or curb surface. The first lip edge 30 preferably extends vertically upward from the platform surface, functioning to prevent inadvertent rolling of a wheelchair off the side of the platform.

The lowering of the first platform section 26 is preferably limited to a substantially horizontal position with respect to the boot tube 24. The flush engagement between the boot tube 24 and the surface of the first platform section 26 proximal to the hinges 28 provides alignment between the first platform section 26 and the boot tube 24.

A second platform section 36 is preferably hingedly positioned for flush engagement to the first platform section 26 along the elongate edge 32. The second platform section 36 is preferably formed of one-piece construction having the same length and width dimensions as the first platform section 26. The second platform section 36 is preferably formed of the same sturdy metallic material as the first platform section 26, which may include a metallic meshed runway surface. The second platform section 36 is preferably rectangular and elongate in shape, including a second lip edge 38 and a second access ledge 40.

During use of the wheelchair lift device 10, the second platform section 36 is folded from overlapping engagement over the first platform section 26 for establishment of a side-by-side relationship therebetween. The engagement between the second platform section 36 and the boot tube 24 is described hereinafter.

The second platform section 36 preferably has a stop plate 42 which is positioned for engagement against the top surface of the boot tube 24. The stop 42 functions to limit the pivotal descent of the second platform section 36 to a substantially horizontal configuration with respect to the boot tube 24, and the first platform section 26, during use of the wheelchair lift device 10.

The second lip edge 38 prevents the inadvertent disengagement of a wheelchair from the side of the second platform section 36. The beveled shape of the first and second access ledges 34 and 40, respectively, facilitates the engagement or disengagement of a wheelchair to a road surface.

Figure 2:
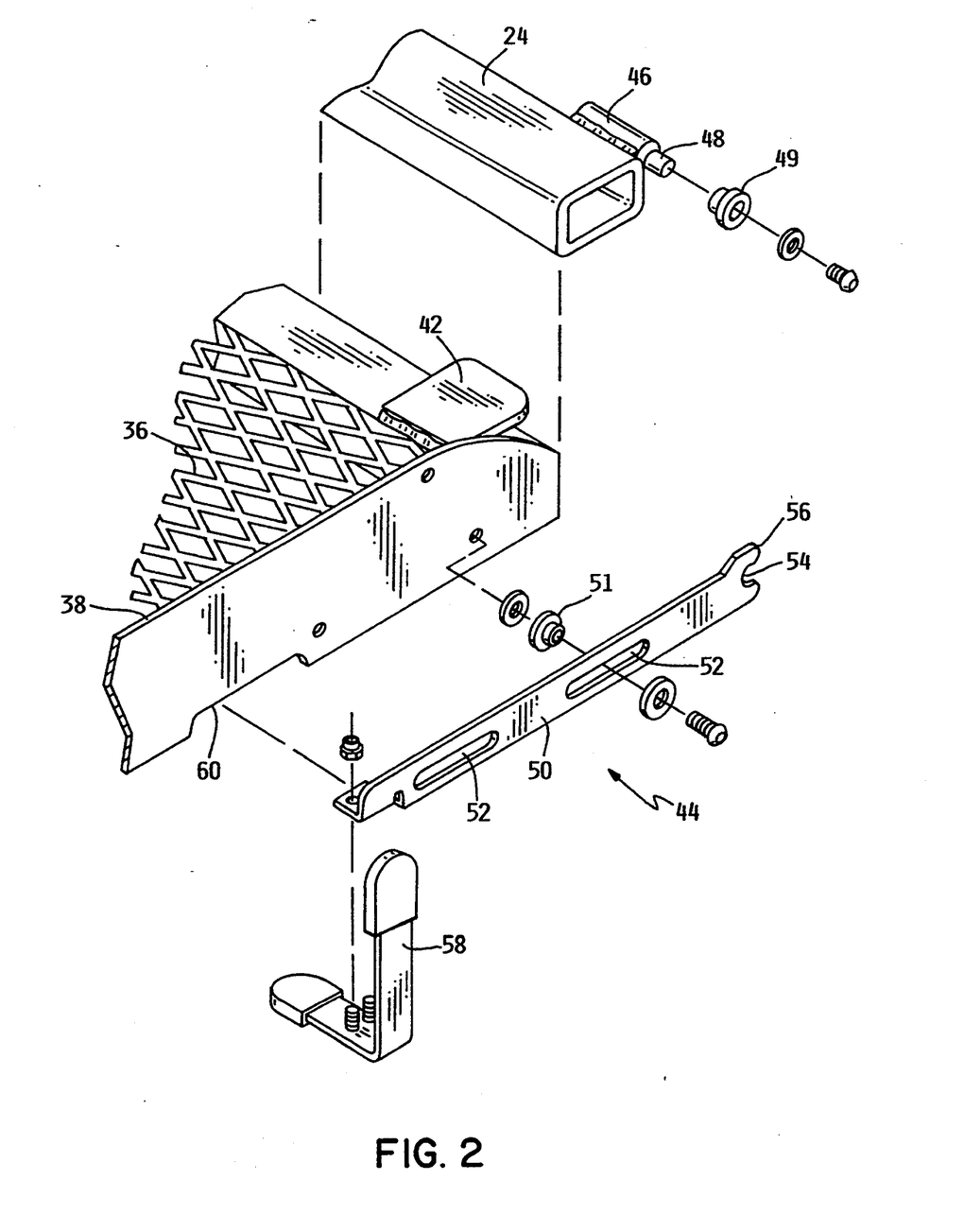
FIG. 2 is a detailed exploded view of latching mechanism.

As shown in FIG. 2, a latching mechanism 44 is preferably affixed to the second platform section 36 along the second lip edge 38. The latching mechanism 44 functions to releasably couple the second platform section 36 to the boot tube 24.

A retaining hinge 46 having an engagement block or pin 48 is preferably affixed to the exterior of the boot tube 24, extending outward therefrom at a position proximal to the stop 42.

The latching mechanism 44 preferably includes an elongate slide 50 having at least two elongate slots 52 therethrough. The elongate slide 50 is preferably slidably attached to the second lip edge 38 by bolts and nuts, including roller bushings 51 in slots 52. Alternatively, the elongate slide 50 may be slidably attached to the second lip edge 38 by any preferred means, including but not limited to, screws, rivets, or pins at the discretion of an individual, provided that the essential functions, features, and attributes described herein are not sacrificed.

The elongate slide 50 includes a notch 54 and a lip 56 which are adapted for coupling engagement to the bushings 49 on engagement pin 48. The engagement of the notch 54 and lip 56 to the bushing 49 pivotally attaches the second platform section 36 to the boot tube 24. The retraction of the elongate slide 50 releases and uncouples the notch 54 and lip 56 from the engagement pin 48. Folding of the second platform section 36 over the first platform section 26 may then occur for storage of the wheelchair lift device 10 during transit of a vehicle.

An L-shaped handle 58 is attached to the elongate slide 50 on the end opposite to the notch 54 and lip 56. The L-shaped handle 58 is preferably attached to the elongate slide 50 by the use of bolts and nuts. Alternatively, the L-shaped handle 58 may be attached to the elongate slide 50 by any means as preferred by an individual including, but not limited to, screws, rivets, or pins provided that the essential functions, features and attributes described herein are not sacrificed.

The elongate slide 50 is preferably positioned along the interior of the second lip edge 38, below the second platform section 36. The L-shaped handle 58 initially extends outwardly from the elongate slide 50, and is preferably positioned for vertical extension outside to the second lip edge 38. The L-shaped handle 58 is preferably located within a recess 60 which traverses the lower surface of the second lip edge 38.

Figure 3:
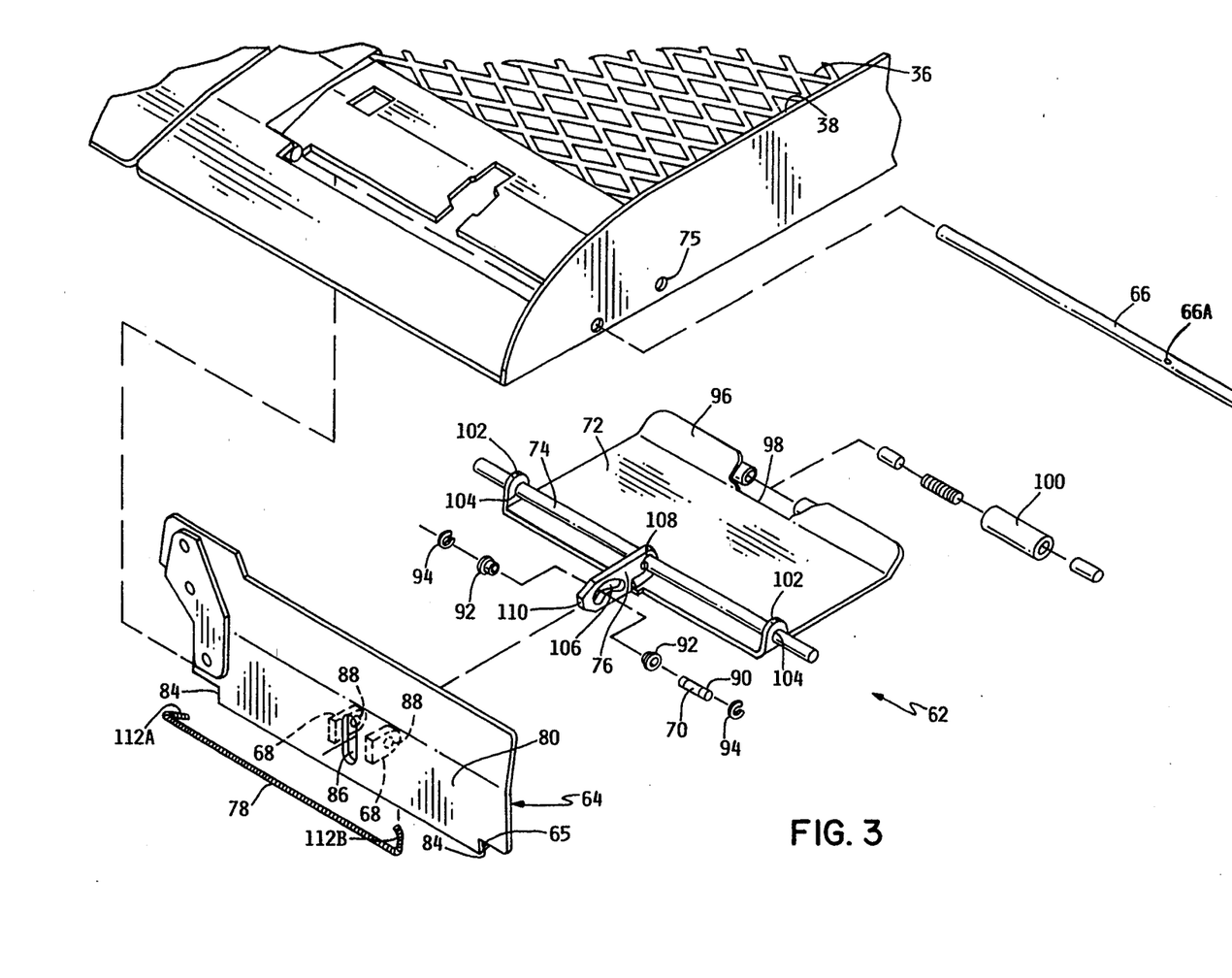
FIG. 3 is a detailed exploded view of the barrier mechanism.

The wheelchair lift device 10 includes a pair of barrier mechanisms which in general are indicated by the numeral 62. Each barrier mechanism 62 is preferably pivotally affixed to each of the first and second platform sections 26, 36, respectively, proximal to the first and second access ledges 34, 40. Each barrier mechanism 62 in general includes the elements of a barrier plate 64, a pivot rod 66, a brace 68, a flipper pin 70, an activator flipper plate 72, a barrier activator rod 74, a flipper tab 76, and a torsion spring 78, as shown in FIG. 3.

Each barrier plate 64 is preferably formed of a sturdy metallic material and includes a substantially rectangular front face 80 and rear surface 82. The front face 80 of each barrier plate 64 additionally includes a substantially flat surface and an angularly offset surface. The angularly offset portion of the front face 80 is shaped for the flush and secure engagement to either the first or second access ledges 34, 40.

Each barrier plate 64 preferably includes a pair of notches 84 positioned at the corners of the lower edge. Each notch 84 preferably extends inward from a side edge of the barrier plate 64. Each barrier plate 64 has a longitudinally extending aperture 65 which extends the entire length of the lower edge between the pair of notches 84. Each barrier plate 64 has an irregularly-shaped barrier guide 64A affixed thereto. The guides 64A each have a predetermined thickness which may be thicker than the barrier plates 64, and each guide 64A forms a raised shoulder along its edge 67 which faces toward the other barrier plate. The function of the barrier guides will be described in connection with FIG. 6.

Each barrier plate 64 preferably extends upward from either the first or second platform sections 26, 36 during the elevation or descent of the wheelchair lift device 10 from a ground surface. During the elevation or descent, each barrier plate 64 functions as a safety stop preventing the inadvertent or accidental rolling of a wheelchair off of the wheelchair lift device 10. Each barrier plate 64 should preferably be of a sufficient size for a vertical extension from either a first access ledge 34 or a second access ledge 40 to function as a stop for a wheelchair during use of the wheelchair lift device 10.

Each barrier plate 64 preferably has a centrally-positioned slot 86 therethrough. Each of the slots 86 are preferably positioned proximate to the lower edge of the barrier plate 64, through the substantially flat surface of a barrier plate 64.

The shape of each barrier plate 64 may be varied at the preference of an individual provided that the essential functions, features and attributes described herein are not sacrificed.

A pivot rod 66 is preferably positioned within, and is fixedly attached to, the interior of the longitudinally extending aperture 65 of a barrier plate 64. Each pivot rod 66 is preferably adapted for engagement to either the first or second lip edges 30, 38 and to the elongate edges 32 of either the first or second platform sections 26, 36 below the first or second access ledge 34, 40. Each pivot rod 66 permits the rotation of a barrier plate 64 with respect to the first and second access ledges 34, 40.

A brace 68 is affixed to the rear surface 82 of each barrier plate 64, along either side of the slot 86. Each brace 68 preferably has a rounded portion including a flipper pin aperture 88 therethrough.

The flipper pin apertures 88 are adapted for receiving engagement of a flipper pin 70. Each flipper pin 70 has a groove 90 positioned proximal to each end, and each flipper pin 70 functions to couple an activator flipper plate 72 to a barrier plate 64 during use of the wheelchair lift device 10. Each flipper pin 70 preferably permits the pivotal movement of an activator flipper plate 72, with respect to the barrier plate 64, during elevation or descent of a wheelchair lift device 10. Each flipper pin 70 includes a pair of retaining bushings 92 centrally positioned between a pair of retaining rings 94. The retaining rings 94 engage the groove 90 to affix the flipper pin 70 to the braces 68 via the apertures 88, and to confine the retaining bushings 92 to the interior of the curved slot 106.

Each activator flipper plate 72 is preferably substantially flat and rectangular in shape having an angularly offset engagement edge 96. Each activator flipper plate 72 is positioned below a first or platform ramp section 26, 36 proximal to the first or second access ledges 34, 40, rearward from the pivot rod 66.

A centrally-positioned channel 98 is preferably located equal distances between each of the sides of the activator flipper plate 72. The channel 98 traverses the angularly offset engagement edge 96, and is adapted for receiving engagement of a roller mechanism 100 which is suitably adapted to facilitate the engagement of the activator flipper plate 72 to a ground or curb surface. Each roller mechanism 100 is freely engaged to the angularly offset engagement edge 96 in order to facilitate rotation during sliding engagement along a ground or curb surface. The use of a roller mechanism 100 significantly improves the useful life of an activator flipper plate 72 and the wheelchair lift device 10.

A pair of tabs 102 are formed on opposite sides of each activator flipper plate 72. Each of the pair of tabs 102 preferably includes a centrally-positioned barrier activator rod aperture 104 passing therethrough.

A barrier activator rod 74 is preferably engaged to each of the pair of tabs 102. Each barrier activator rod 74 preferably pivotally attaches an activator flipper plate 72 to either the first or second platform sections 26, 36, respectively, through openings 75.

A flipper tab 76 is centrally positioned between each of the pairs of tabs 102, and is affixed to both the activator flipper plate 72 and the corresponding barrier activator rod 74, extending outwardly therefrom. Each flipper tab 76 preferably includes a centrally-positioned banana-shaped aperture 106 therethrough. The flipper pin 70 passes through each of the banana-shaped apertures 106 prior to engagement to the braces 68.

Each flipper tab 76 has an arcuate-shaped nose section 110 which is positioned within the slot 86 of a corresponding barrier plate 64. Each banana-shaped aperture 106 is adapted for pivotal positioning with respect to a flipper pin 70 and a corresponding barrier plate 64. The purpose of each banana-shaped aperture 106 is to permit the adjustable positioning between a flipper tab 76 and a flipper pin 70 for pivotal retraction of a corresponding barrier plate 64.

A torsion spring 78 is positioned adjacent each pivot rod 66. Each spring 78 includes a pair of oppositely divergent spring ends 112A, 112B, which are angularly offset from the axis of torsion spring 78. One end 112A is preferably adapted for engagement to the rear surface 82 of a barrier plate 64, and the other end 112B is preferably adapted for engagement into a hole 66A in pivot rod 66. Each torsion spring 78 functions to pivotally rotate the barrier plate 64 toward a vertical direction from the first or second platform sections 26, 36 for raised positioning thereto.

During use of a wheelchair lift device 10, each activator flipper plate 72 functions to engage a ground or curb surface for pivotal upward rotation toward the first or second platform sections 26, 36. The pivotal rotation of each activator flipper plate 72 retracts a corresponding barrier plate 64 from a vertical to a horizontal position upon the first or second access ledges 34, 40. The pivotal downward rotation of each barrier plate 64 retracts the safety stop mechanism providing access to or from the first or second platform section 26, 36.

Figure 4:
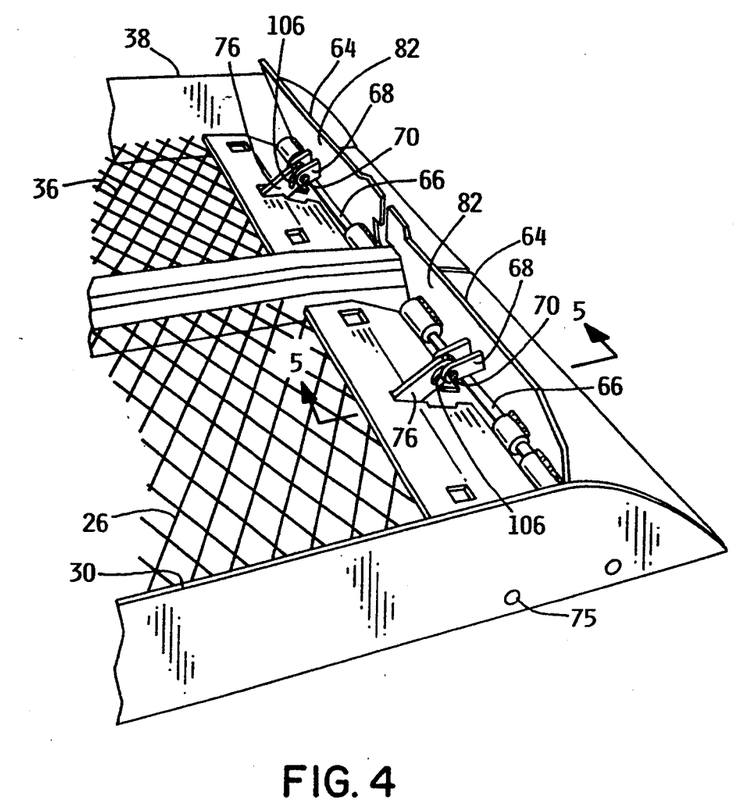
FIG. 4 is a rear isometric view of the barrier mechanism in a safety position.
Figure 6:
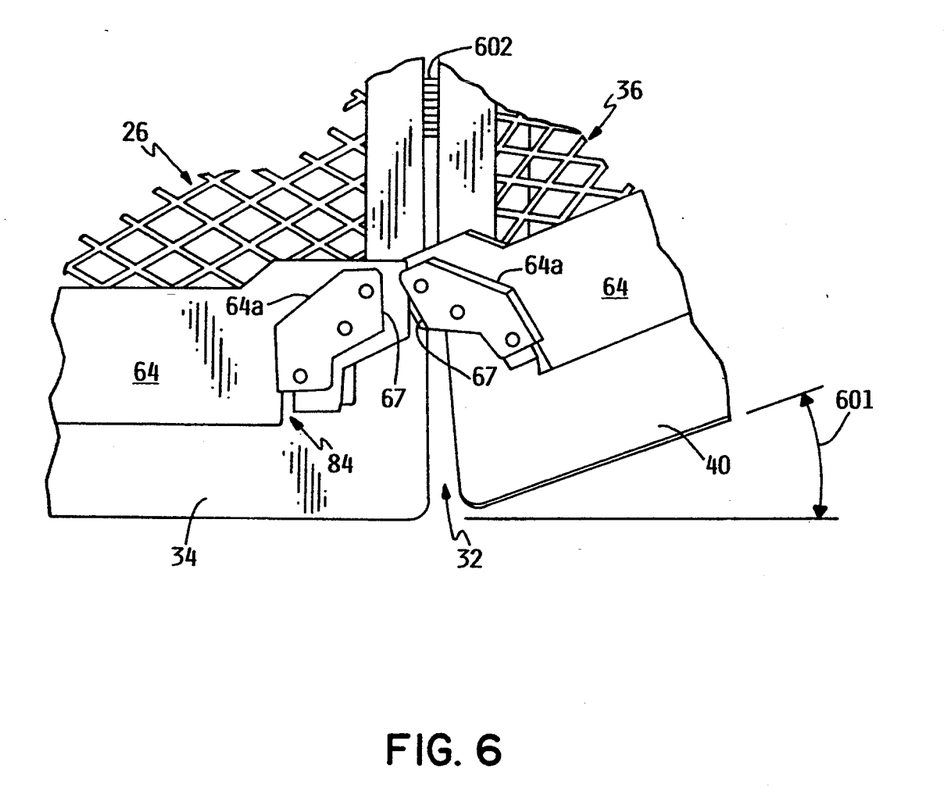
FIG. 6 is an enlarged partial view showing the platform sections partially folded together.

FIG. 6 shows a partial view of the platform's sections 26 and 36 in a partially folded position. Platform section 36 may be raised about center edge 32, as shown by arrow 601, so as to be folded over platform section 26. Platform section 36 pivots about a plurality of hinges 602 which are respectively affixed to both platform sections 26 and 36. If the platform sections are raised from the ground when the folding operation is attempted, the barrier plates 64 will be each raised in a position such as is illustrated in FIG. 4. If the barrier plates 64 are respectively in a raised position when the platform sections are folded, the barrier guides 64A will force the barrier plate 64 downwardly into a flat position against the respective platform sections. Each barrier guide 64a has a relative thickness and creates a raised shoulder along its inner edge 67. If the right platform section 36 is folded upwardly as shown by arrow 601, the raised shoulder of right barrier guide 64A will engage against the left barrier plate 64 as shown in FIG. 6. As the right most platform section is raised further, the barrier guide pivots about hinge 602 and forces the left-most barrier plate 64 downwardly. As the pivoting action continues about hinge 602, the two barrier plates become pressed against their respective platform sections so that platform section 36 may ultimately be folded completely over upon platform section 26. The barrier guides 64A are each operative as described above, depending upon which barrier plate has the higher inclined angle as the platform sections are folded together, and in either case the barrier plates 64 become compressed against the respective platform sections.

During operation of the wheelchair lift device 10, the lowering of the first and second platform sections 26, 36 causes the roller mechanisms 100 of the activator flipper plates 72 to contact a ground or curb surface. Upon the continued lowering of the first and second platform sections 26, 36, the activator flipper plates 72 pivot upwardly toward the first and second platform sections 26, 36 as indicated by arrow 200 of FIG. 5. The activator flipper plates 72 pivot about the barrier activator rods 74. The fixed positioning of the pivot rods 66, with respect to the barrier activator rods 74, causes the forward movement of the flipper tabs 76, as indicated by arrow 202, into the slot 86 of a barrier plate 64. The banana-shaped apertures 106 guide the flipper pins 70, and when the flipper pins 70 reach the end of apertures 106, the barrier plate 64 is forced to pivot downwardly about pivot rod 66, in opposition to the spring force of torsion spring 78. The forward movement of the flipper tabs 76 causes the pivotal retraction of the barrier plates 64 about the pivot rods 66 from a vertical position toward the first and second platform sections 26, 36, as indicated by arrow 210 in FIG. 5. At such time as the activator flipper plates 72 are horizontally positioned with respect to the first or second platforms 26, 36, the barrier plates 64 have been fully retracted for flush engagement to the first or second platform sections 26, 36. The safety stop mechanism has therefore been disengaged, permitting free access onto, or from, the wheelchair lift device 10 by an individual.

Figure 5:
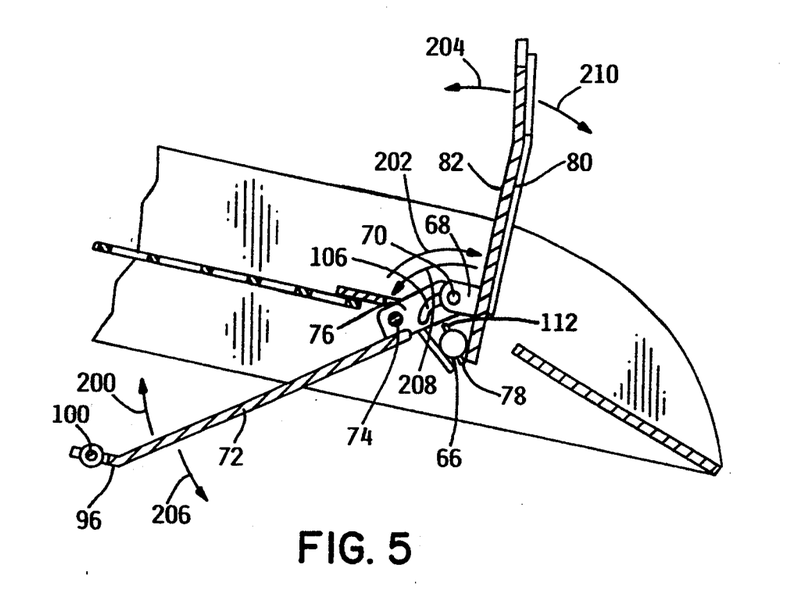
FIG. 5 is a cross-sectional side view of the barrier mechanism taken along the line 5—5 of FIG. 4.

During elevation of the first and second platform sections 26, 36 from a ground or curb surface, the activator flipper plates 72 pivot downward from a horizontal position as indicated by arrow 206 of FIG. 5. The downward rotation of the activator flipper plates 72 pivot the flipper tabs 76 about the barrier activator rods 74. The banana-shaped apertures 106 are then rotated in a rearward direction with respect to the flipper pins 70 as indicated by arrow 208 of FIG. 5. The rearward rotation of the banana-shaped apertures 106 from the flipper pins 70 releases the torsion force of the spring 78, as engaged between the rear surfaces 82 of the barrier plates 64 and the respective platform sections. The torsion spring 78 pivots the barrier plates 64 about the pivot rods 66 in a vertical direction as indicated by arrow 204 of FIG. 5. The complete downward pivotal rotation of the activator flipper plates 72 repositions the flipper pins 70 within the banana-shaped apertures 106.

The present invention may be embodied in other specific forms without departing from the spirit or essential attributes thereof; therefore, the illustrated embodiment should be considered in all respects as illustrative and not restrictive, reference being made to the appended claims rather than to the foregoing description to indicate the scope of the invention.

What is claimed is:

1. A wheelchair lift device for raising or lowering a wheelchair into or from a vehicle, said wheelchair lift device comprising:
   (a) a lift mechanism affixed to said vehicle, said lift mechanism having a pivotally movable frame, said frame having an elongate boot tube;
   (b) a retractable first platform section pivotally attached to said frame, said first platform section having a first access ledge;
   (c) a second platform section foldably attached to said first platform section, said second platform section having a stop for engaging said boot tube, said second platform section further having a second access ledge; and
   (d) a first barrier mechanism pivotally attached to said first platform section proximal to said first access ledge and a second barrier mechanism pivotally attached to said second platform section proximal to said second access ledge, each of said barrier mechanisms comprising:
     (i) a barrier plate having an aperture therethrough, said barrier plate pivotally attached to a pivot rod on said platform section, for positioning of said barrier plate above said first platform section, said barrier plate further having a rear surface, said rear surface having a brace;
     (ii) an activator flipper plate having an engagement edge having a roller, said activator flipper plate further having a barrier activator rod having a flipper tab extending outwardly therefrom, said barrier activator rod pivotally attached to said platform section, said flipper tab pivotally connected to said brace; and
     (iii) a torsion spring positioned along said pivot rod, said spring engaging between said barrier plate and said pivot rod, where pivotal movement of said activator flipper plate about said barrier activator rod toward said first platform section pivotally retracts said barrier plate about said pivot rod from a position above said platform section to a position in flush engagement to said platform section.

2. The wheelchair lift device according to claim 1, wherein said boot tube has a retaining hinge having an engagement pin.

3. The wheelchair lift device according to claim 2, further comprising a latching mechanism attached to said second platform section for engaging said engagement pin, said latching mechanism comprising:
   (a) an elongate slide having at least one elongate aperture therethrough, said elongate slide being slidably engageable to said second platform section, said elongate slide having a notch for releasably coupling to said engagement pin for fixed, unfolded engagement of said second platform section to boot tube; and
   (b) a handle affixed to said elongate slide for sliding said elongate slide toward and away from said engagement pin.

4. The wheelchair lift device according to claim 3, wherein said second platform section is foldably attached to said first platform section.

5. The wheelchair lift device according to claim 1, wherein said barrier plate further comprises a raised barrier plate guide.

6. The wheelchair lift device according to claim 5, wherein each of said barrier plate guides is engageable against the other barrier plate.

7. The wheelchair lift device according to claim 6, wherein each of said barrier activator rods is positioned proximal to one of said pivot rods, between one of said pivot rods and said boot tube.

8. The wheelchair lift device according to claim 1, wherein each of said activator flipper plates comprises an angularly offset edge and a pair of tabs engaged to and supporting said barrier activator rod above said activator flipper plate.

9. The wheelchair lift device according to claim 8, wherein each of said angularly offset edges extends upwardly from one of said activator flipper plates, each of said angularly offset edges having a centrally-positioned roller.

10. The wheelchair lift device according to claim 9, wherein each of said flipper tabs is affixed to one of said barrier activator rods and to one of said activator flipper plates centrally between said brackets.

11. A wheelchair lift device for raising or lowering a wheelchair into or from a vehicle, said wheelchair lift device comprising:
    (a) a lift mechanism affixed to said vehicle, said lift mechanism having a pivotally-connected frame having an elongate boot tube, said boot tube having an engagement pin;
    (b) a first platform section pivotally attached to said lift mechanism and to said boot tube, said first platform section having a first access ledge;
    (c) a second platform section foldably attached to said first platform section, said second platform section having a stop for engaging said boot tube, said second platform section further having a second access ledge;
    (d) a barrier mechanism pivotally attached to said first platform section proximal to said first access ledge and another barrier mechanism pivotally attached to said second platform-section proximal to said second access ledge, each of said barrier mechanisms comprising:
      (i) a barrier plate having an aperture therethrough, said barrier plate pivotally attached to a pivot rod for positioning of said barrier plate above said respective platform section, said barrier plate further having a rear surface, said rear surface having a brace holding a flipper pin positioned over said aperture;
      (ii) an activator flipper plate having an engagement edge having a roller, said activator flipper plate further having a barrier activator rod having a flipper tab extending outwardly therefrom, said barrier activator rod pivotally attached to said respective platform section, said flipper tab positioned in said aperture through said barrier plate, said flipper tab having a banana-shaped aperture therethrough, said flipper pin passing through said banana-shaped aperture attaching said activator flipper plate to said barrier plate, said barrier plate and said activator flipper plate angularly offset with respect to each other; and (iii) a spring positioned adjacent said pivot rod, said spring engaging said barrier plate and said pivot rod, wherein pivotal movement of said activator flipper plate about said barrier activator rod toward said first platform section or toward said second platform section causes said spring to react, and causes said barrier plate to pivotally retract about said pivot rod from a position above said first platform section or said second platform section to a position in flush engagement to said first platform section or said second platform; and (e) a latching mechanism attached to said second platform section for engaging said boot tube, said latching mechanism comprising:
 (i) an elongate slide having at least one elongate aperture therethrough, said elongate slide being engaged to said second platform section, said elongate slide having a notch having an engagement lip for releasably coupling said engagement lip and said notch to said engagement pin for pivotal, unfolded engagement of said second platform section to said boot tube; and
 (ii) a handle affixed to and extending from said elongate slide for sliding said elongate slide toward and away from said engagement pin.

12. The wheelchair lift device according to claim 11, wherein said second platform section is foldably attached to said first platform section.

13. The wheelchair lift device according to claim 12, wherein said barrier plate has a barrier guide engageable against the other barrier plate when the platform sections are respectively folded.

14. The wheelchair lift device according to claim 13, wherein said aperture is elongate and is centrally positioned through said flat surface of said barrier plate.

15. The wheelchair lift device according to claim 14, wherein each of said barrier activator rods is positioned proximal to one of said pivot rods, between one of said pivot rods and said boot tube.

16. The wheelchair lift device according to claim 11, wherein each of said activator flipper plates comprises an angularly offset edge and a pair of tabs supporting said barrier activator rod above said activator flipper plate.

17. The wheelchair lift device according to claim 16, wherein each of said angularly offset edges extends upwardly from said activator flipper plates, each of said angularly offset edges having a roller rotatably affixed thereto.

18. The wheelchair lift device according to claim 17, wherein each of said flipper tabs is affixed to one of said barrier activator rods and to one of said barrier plates centrally between said flipper plate tabs.

19. A wheelchair lift device for raising or lowering a wheelchair into or from a vehicle, said wheelchair lift device comprising:
(a) an electrically-operated lift mechanism affixed to said vehicle, said lift mechanism having a pivotal frame having an elongate boot tube, said boot tube having a retaining hinge having an engagement pin;
(b) a first platform section pivotally attached to said lift mechanism and to said boot tube, said first platform section having a first access ledge;
(c) a second platform section foldably attached to said first platform section, said second platform section having a stop for engaging said boot tube, said second platform section further having a second access ledge; and
(d) a latching mechanism attached to said second platform section for engaging said boot tube, said latching mechanism comprising:
 (i) an elongate slide having at least one elongate aperture therethrough, said elongate slide being engaged to said second platform section, said elongate slide having a notch having an engagement lip for releasably coupling said engagement lip and said notch to said engagement pin for pivotal, unfolded engagement of said second platform section to said boot tube; and
 (ii) a handle affixed to and extending from said elongate slide for sliding said elongate slide toward and away from said engagement pin.

20. The wheelchair lift device according to claim 19, further comprising a barrier mechanism pivotally attached to said first platform section proximal to said first access ledge and another barrier mechanism pivotally attached to said second platform section proximal to said second access ledge, each of said barrier mechanisms comprising:
(a) a barrier plate having an aperture therethrough, said barrier plate pivotally attached to a pivot rod for positioning of said barrier plate above said platform section, said barrier plate further having a rear surface, said rear surface having a brace holding a flipper pin positioned over said aperture;
(b) an activator flipper plate having an engagement edge having a roller, said activator flipper plate further having a barrier activator rod having a flipper tab extending outwardly therefrom, said barrier activator rod pivotally attached to said platform section, said flipper tab positioned in said aperture through said barrier plate, said flipper tab having a banana-shaped aperture therethrough, said flipper pin passing through said banana-shaped aperture attaching said activator flipper plate to said barrier plate, said barrier plate and said activator flipper plate angularly offset with respect to each other; and
(c) a spring positioned adjacent said pivot rod, said spring engaging said barrier plate and said pivot rod, wherein pivotal movement of said activator flipper plate about said barrier activator rod toward said platform section causes said spring to twist, and causes said barrier plate to pivotally retract about said pivot rod from a position above said platform section to a position in flush engagement to said platform section.

21. A wheelchair lift device for raising or lowering a wheelchair into or from a vehicle, said wheelchair lift device comprising:
(a) a lift mechanism affixed to said vehicle, said lift mechanism having a pivotal frame having an elongate boot tube;
(b) an elongate first platform section pivotally attached to said lift mechanism and to said boot tube, said first platform section having a first access ledge, said first platform section extending perpendicularly outward from said boot tube, said first platform section further having an elongate engagement edge positioned perpendicular to said boot tube;

(c) an elongate second platform section foldably attached to said first platform section along said elongate engagement edge, said second platform section extending perpendicularly outward from said boot tube, said second platform section having a stop for engaging said boot tube, said second platform section further having a second access ledge; and (d) a barrier mechanism pivotally attached to said first platform section proximal to said first access ledge and another barrier mechanism pivotally attached to said second platform section proximal to said second access ledge, each of said barrier mechanisms comprising:

(i) a barrier plate having an aperture therethrough, said barrier plate pivotally attached to a pivot rod for positioning of said barrier plate above said platform section, said barrier plate further having a rear surface, said rear surface having a brace holding a flipper pin positioned over said aperture;

(ii) an activator flipper plate having a barrier activator rod having a flipper tab extending outwardly therefrom, said barrier activator rod pivotally attached to said platform section, said flipper tab positioned in said aperture through said barrier plate, said flipper tab having a banana-shaped aperture therethrough, said flipper pin passing through said banana-shaped aperture attaching said activator flipper plate to said barrier plate, said barrier plate and said activator flipper plate angularly offset with respect to each other; and (iii) a spring positioned adjacent said pivot rod, said spring engaging said barrier plate and said pivot rod, wherein pivotal movement of said activator flipper plate about said barrier activator rod toward said platform section causes said spring to flex, and causes said barrier plate to pivotally retract about said pivot rod from a position above said platform section to a position in flush engagement to said platform section.

22. The wheelchair lift device according to claim 21, wherein said boot tube has a retaining bushing having an engagement rod.

23. The wheelchair lift device according to claim 22, further comprising a latching mechanism attached to said second platform section for engaging said boot tube, said latching mechanism comprising:

(a) an elongate slide having at least one elongate aperture therethrough, said elongate slide being engaged to said second platform section, said elongate slide having a notch having an engagement lip for releasably coupling said engagement lip and said notch to said engagement rod for pivotal, unfolded engagement of said second platform section to said boot tube; and (b) a handle affixed to and extending from said elongate slide for sliding said elongate slide toward and away from said engagement rod.

* * * * *